Aug. 12, 1924.
J. W. SOFGE
1,504,987
LUBRICANT INDICATOR
Filed April 8, 1922
3 Sheets-Sheet 1
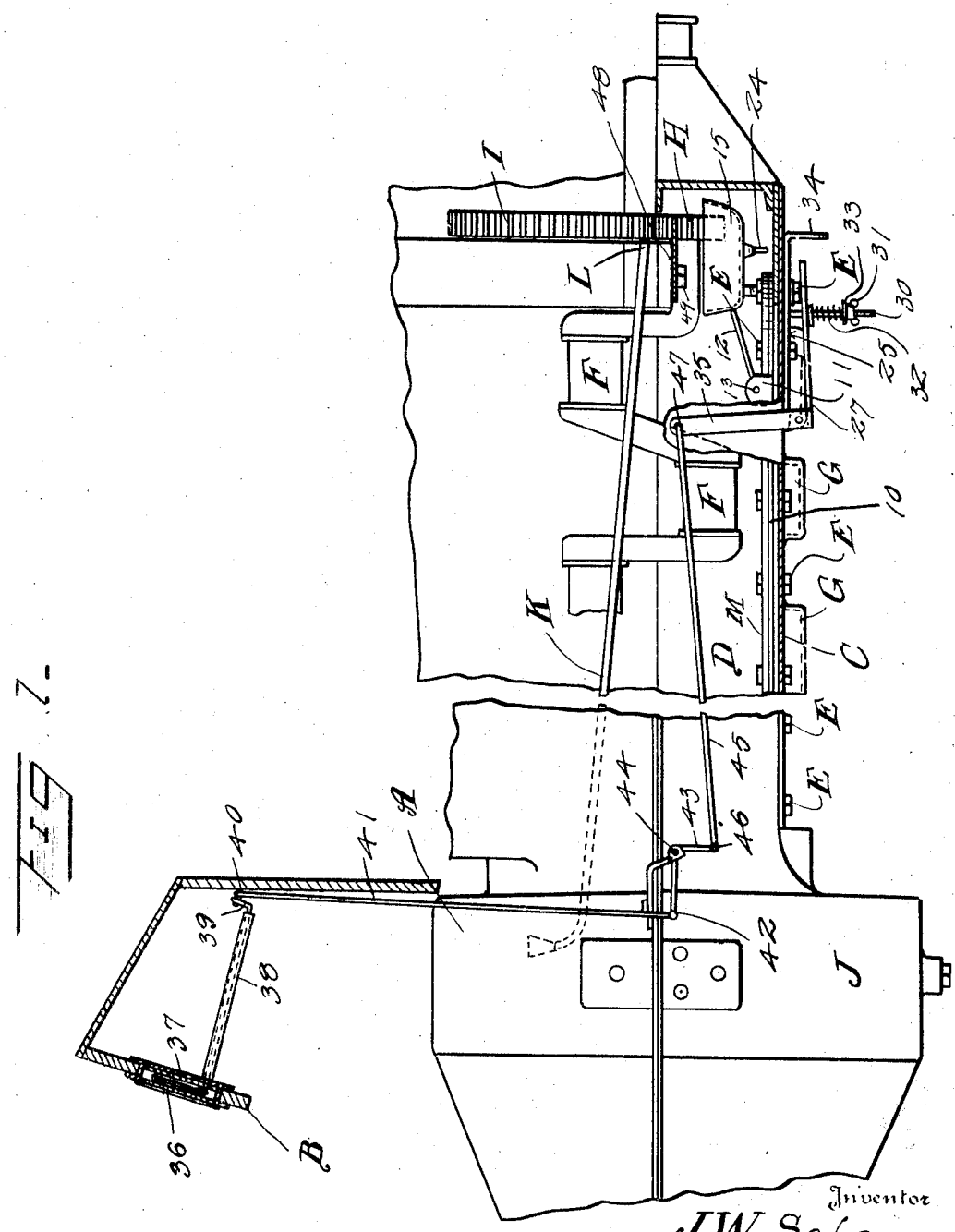

Aug. 12, 1924.　　　　　　　　　　　　　　　　　　1,504,987
J. W. SOFGE
LUBRICANT INDICATOR
Filed April 8, 1922　　　　3 Sheets-Sheet 2
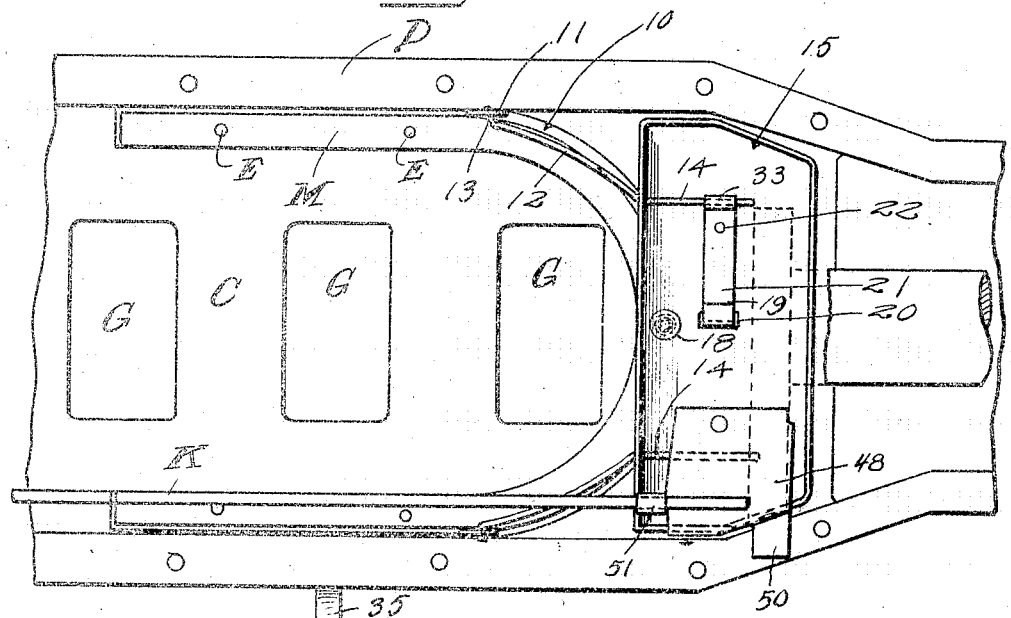
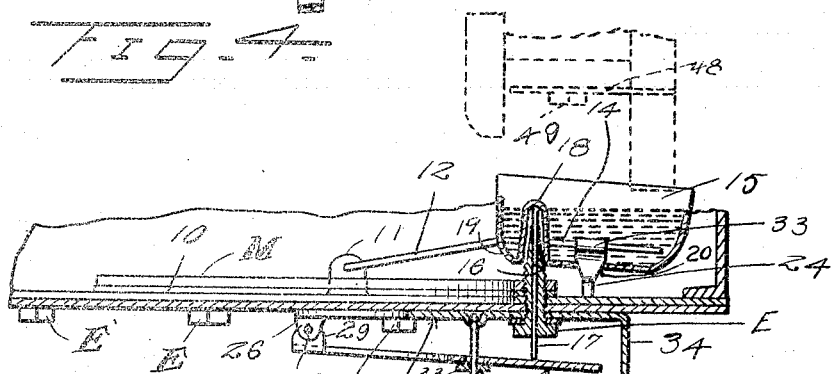
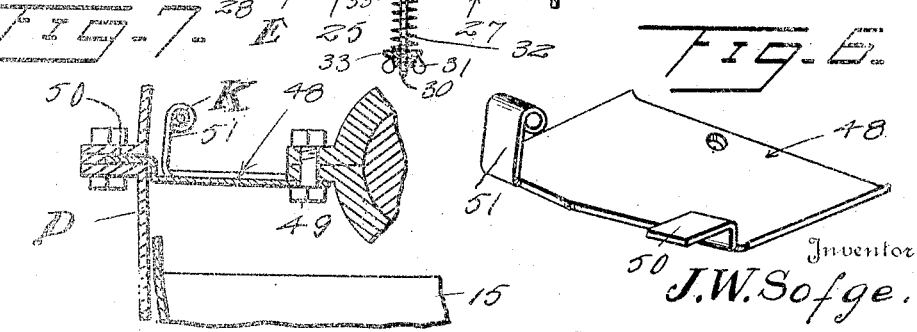
Inventor
J. W. Sofge.
By
Attorney

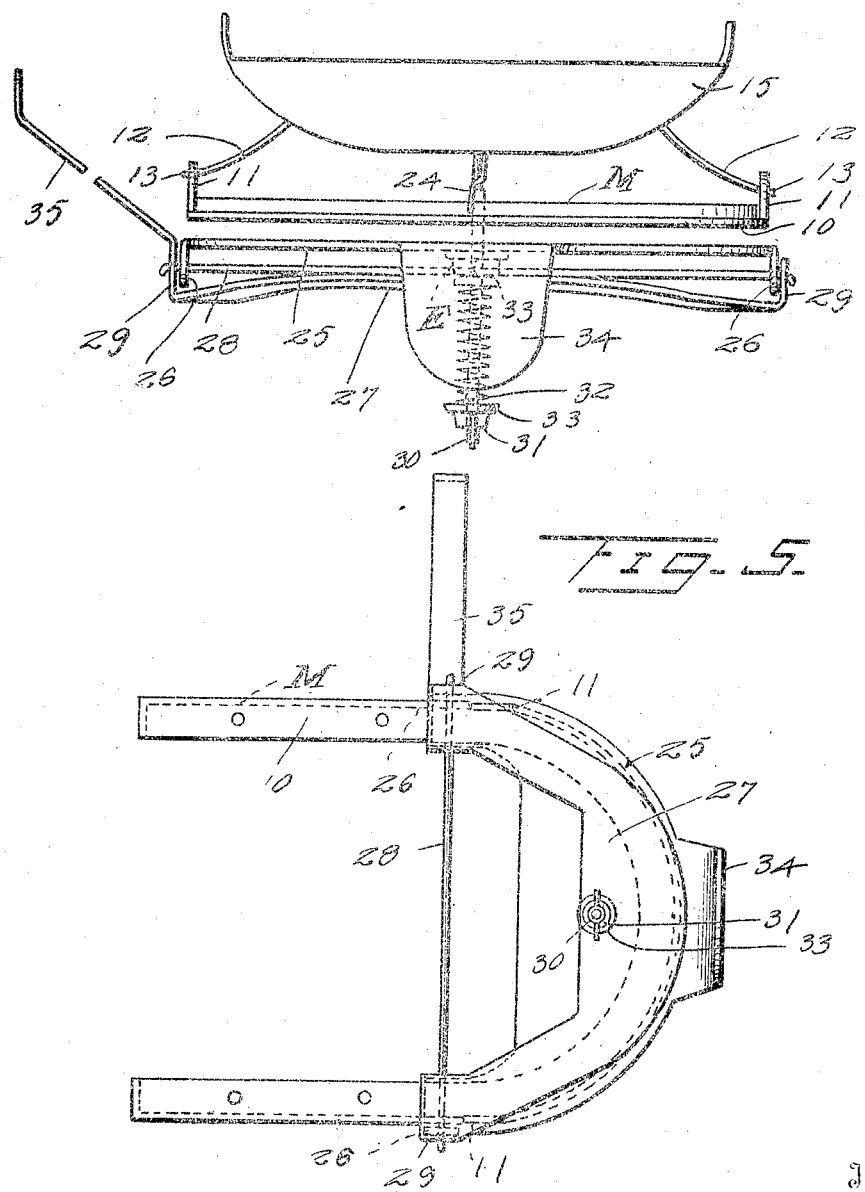

Patented Aug. 12, 1924.

1,504,987

UNITED STATES PATENT OFFICE.

JOHN W. SOFGE, OF SOUTH JACKSONVILLE, FLORIDA.

LUBRICANT INDICATOR.

Application filed April 8, 1922. Serial No. 550,796.

*To all whom it may concern:*

Be it known that I, JOHN W. SOFGE, a citizen of the United States, residing at South Jacksonville, in the county of Duval and State of Florida, have invented certain new and useful Improvements in a Lubricant Indicator; and I do hereby declare the following to be a full, clear, and exact description of the invention, such as will enable others skilled in the art to which it appertains to make and use the same.

This invention relates to a lubricant indicating mechanism for internal combustion engines of the vehicle-propelling, marine and stationary types.

In motors of the said class which have a splash system of lubrication, a feed pipe is used to catch lubricant and convey it to gearing of timing or other mechanism. Such pipe in actual practice frequently clogs, thus cutting off the flow of lubricant and resulting in the burning of bearings and other moving parts. The present invention aims to provide an efficient, inexpensive and novel means to positively indicate the proper flow of the lubricant and particularly through the said type to overcome the objection stated.

In accomplishing the said object, it is aimed to provide such a mechanism as will indicate the oil level in order that it may additionally function as an oil level gage.

Another object is to provide in such a mechanism, a receptacle to receive oil supplied by the pipe and which is movable to actuate an indicator, a receptacle having means operable for release of the oil thereof and particularly through the medium of a valve adapted to open as the receptacle descends.

Still another object is to provide a lever mechanism to mount the receptacle and a spring means associated with the lever mechanism to resist descent of the receptacle.

One more object of the invention is to provide the indicating means exteriorly of the crank case and a connection between the same and the operating parts within the crank casing which avoids the necessity of using a packing box or means including packing.

It is still further aimed to provide a construction which may serve as an attachment so as to be applicable to one or more standard constructions of engines without necessitating change in the arrangement or details of its parts to accommodate the use thereof.

Additional objects and advantages will become apparent from a consideration of the description following taken in connection with accompanying drawings illustrating one practical embodiment.

In said drawings:—

Figure 1 is a side view of an automobile-propelling engine and fragmentary automobile parts, and partly in section, showing the equipment of my improvement thereto;

Figure 2 is a plan view of my improvements, fragments of the engine casing being shown to facilitate an understanding of its attachment;

Figure 3 is an end elevation;

Figure 4 is an enlarged longitudinal sectional view particularly through the receptacle and adjacent parts, showing the receptacle partly filled with lubricant and taken substantially centrally thereof;

Figure 5 is an inverted plan view showing the attachment of the exterior operating lever;

Figure 6 is a detail perspective view of a lubricant deflector which may be employed in connection with the invention, and Figure 7 is a detail transverse sectional view showing the mounting of the said deflector.

Like reference characters designate like or similar parts in the different views.

To facilitate an understanding of the invention, the same has been shown in connection with a conventional automobile-propelling engine and automobile parts. The engine is designated generally as A and an automobile instrument board generally as B. The casing of the engine has a drip pan as at C detachably secured to other sections D thereof by means of bolts E. The crank of the main shafts of the engine are shown as at F and are operatively associated with lubricant or oil dippers G of said drip pan C. Timing gears to control the ignition system or firing of the engine are shown as at H and I. The timing gears H and I are adapted to be lubricated by oil or lubricant splashed from a reservoir J of the engine through operation of its parts into a pipe K which discharges the same at its outlet L on to said gears H and I. In practice, the pipe K frequently clogs and thus cuts off the supply of lubricant to the timing gears and adjacent parts, resulting in the burning of their bearings or moving parts. The present invention overcomes this objection and provides a means positively indicating the effective flow of lubricant through the pipe K at all times. Intermediate the pans C and parts D, a frame M is secured in place by the bolts E and is standard construction. In adapting my invention to practice, a substantially U-shaped bracket is employed as at 10 having suitable openings through which the bolts E pass to secure it in place. below the frame M. Integral with the bracket 10 and upstanding at its sides are ears 11 through which bails 12 are pivoted for vertical movement as at 13. Said bails 12 have attaching arms 14 which extend into a receptacle 15 and are soldered or otherwise secured thereto as shown. Any suitable means may be used instead of the bails 12 to position receptacle 15 as will be understood.

The receptacle 15 may be of any suitable shape but preferably conforms to the surrounding curvature of the engine casing and it is disposed directly beneath the gears H and I and their bearings.

One of the bolts or set screws E is provided with a longitudinal bore therethrough at 16 and slidable therein is an operating stem 17 depending from the receptacle 15. At 18 the bottom wall of receptacle 15 is raised into a dome and from the top thereof, the said stem 17 directly depends. Also the set screw E having the bore 16 is raised a considerable distance as at 19 (Figure 4) above the pan C or bottom wall of the engine casing. As will be understood the engine casing contains a certain quantity of lubricant and the portion 19 is movable within the dome 18 and thus above the base of the receptacle 15 without forming a means of escape of the lubricant to the exterior of the casing which avoids the use of a packing box or packing at this point.

The bottom wall of the receptacle 15 is provided with an oil or lubricant discharge port or opening at 20, normally partly closed by a valve of any suitable shape or type, for instance that shown at 21, which is in the form of an elongated metallic leaf spring (Figure 2), fastened as by means of a rivet 22 to the receptacle 15 and having one end curled as at 33 to overlap an end of one of the attaching arms 14 which passes therethrough, thus tending to prevent turning of the valve on the rivet 22 as a pivot. Depending from the valve 21 through the port 20 and extending a distance below the same is a stud 24 which does not completely close port 20. As the receptacle descends, the stud 24 is adapted to engage the pan C or bottom wall of the engine casing, thus prohibiting further movement of the valve downwardly in order that the receptacle may travel downwardly to a greater extent or independently of the valve and thus open the port 20 to the desired extent to facilitate or increase the escape of lubricant from the receptacle.

A bracket 25 is secured exteriorly of the engine casing by the said bolts or set screws E and it has depending ears 26 to which a substantially U-shaped lever 27 is pivoted by pins at 28 passing through ears 29 thereof and the said ears 26. The stem 17 rests directly on the lever 27. The lever is normally urged upwardly. To this end, a bolt 30 depends from the bracket 25, passing loosely through an opening in the lever 27 and having a nut 31 screw threaded thereon. An expansive spring 32 of the coil type surrounds the bolt 30 and its ends are engaged in retainers 33 loose on the bolt 30 and one bearing against the lever 27 and the other against the nut 31. The rear end of bracket 25 may depend to form a shield at 34 for the lever 27 and the bolts 30 and spring 32 and associated parts. A crank arm 35 rises from the lever 27 and its movement is adapted to be communicated in any suitable manner to a pivoted indicator arm 36 of an indicator 37 which may be disposed on the instrument board B or at any other desired location. The indicator 36 may be carried on a turntable spindle 38 having a crank 39 pivotally connected at 40 to a connecting link 41. Link 41 is pivotally connected at 42 to a bell crank 43 pivoted at 44 and having a connecting rod 45 pivoted thereto at 46 and which is pivoted at 47 to the crank arm 35. It will be understood of course that the indicating means is to be taken as conventional, since an electric switch or any appropriate means may be operated from the lever 37 as at its crank arm 35.

In order to facilitate the collection of the maximum quantity of lubricant in the receptacle 15, a deflector is provided as at 48, adjacent to the gears H and I and over the receptacle 15. This deflector may be secured in place in any suitable manner for instance, by means of a bolt 49, forming a standard part of the engine or its casing and passing through an opening in the deflector. In addition it may have an attaching lug at 50 interposed between sections of the casing and secured by the clamping of the sections together and furthermore it may have an attaching tongue 51, which is preferably of flexible metal like the deflector and bent or coiled about the pipe K as shown.

In use, when the engine is in motion, the lubricant or oil is splashed by the operating parts in the reservoir J into the pipe K as usual and travels through the pipe K and discharges as usual at L on to or adjacent the timing gear wheels H and I. Instead of the oil dripping from the gears H and I and associated parts directly into the crankcase and flowing back to the reservoir J, the same drips into the receptacle 15. As stud 24 but partly closes the port 20 oil escapes therethrough but to an extent insufficient to enable the oil to escape from the receptacle to the same degree that it is filled, thus causing an accumulation of the oil in the receptacle. As the oil accumulates in the receptacle 15, its weight causes the receptacle 15 to descend, swinging downwardly on its pivots 13 and moving the stem 17 against the lever 27, rocking the lever against the tension of the spring 32 and accordingly shifting the crank arm 35 which through the medium of the rod 45, bell crank 43, rod 40, rod 38 and indicator 36, indicating the fact at the instrument board that oil is properly flowing through the pipe K. In the event oil does not properly flow through the pipe K, the indicator or instrument at 36 does not operate at all as is obvious. As the receptacle 15 descends, the stud 24 by engagement with the pan C limits descent of the pan thus causing the receptacle to move away from or independently of the valve 21, opening the port 20 and permitting the oil or lubricant to flow therethrough more freely but not to a degree which will permit the receptacle 15 to return to its normal position. When the operation of the engine ceases, the oil drains from the receptacle 15 through the port 20, gradually rising, whereby the valve 21 moves to its normal position preparatory to further operation, assisted by the expansion of spring 32. The receptacle 15 preferably permits enough oil to drain therefrom after operation of the engine to insure filling of the oil dippers at G, thus insuring a sufficient quantity of lubricant therein to coact with the cranks F on the engine again starting to operate.

As merely one practical embodiment has been illustrated and described, it is to be understood that changes in the details may be resorted to provided they fall within the spirit and scope of the invention.

I claim as my invention:—

1. A lubricant indicating mechanism for an internal combustion engine including a gravity receptable in the path of travel of lubricant and adapted to catch the same, said receptacle having a lubricant escape port, a valve for said port, and said valve being operable to open the port adjacent the end of the movement of the receptacle.

2. A lubricant indicating mechanism for an internal combustion engine including a receptacle, means to position said receptacle, said receptacle being disposed in the path of travel of the lubricant and adapted for movement by gravity through the accumulation of lubricant therein, said receptacle having an escape port, a valve associated with said port, and said positioning means cooperating with said valve to prevent displacement thereof.

3. A lubricant indicating mechanism for an internal combustion engine including a gravity receptacle disposed in the path of travel of the lubricant and movable through accumulation of the lubricant therein, means to position the receptacle, a valve for said means, said receptacle having an escape port, said valve cooperating with said port, and a stud depending from said valve for engagement by an obstruction through movement of the receptacle to open the port.

4. A lubricant indicating mechanism for an internal combustion engine including a receptacle disposed in the path of travel of lubricant for actuation by gravity on accumulation of lubricant therein, means to fulcrum said receptacle, spring means to urge the receptacle to normal position, and indicating means operable through movement of the receptacle.

5. A lubricant indicating mechanism for an internal combustion engine including a receptacle disposed in the path of travel of the lubricant and for actuation by gravity on the accumulation of the lubricant therein, said receptacle having an inwardly extending dome, a lubricant receptacle in which the first mentioned receptacle is disposed, means rising from the second mentioned receptacle and entering said dome, means depending from the dome through the first mentioned means, and means engageable with the second mentioned means to normally elevate the first mentioned receptacle.

6. A lubricant indicating mechanism for an internal combustion engine including a receptacle, movable by gravity through accumulation of lubricant therein, said receptacle having an inwardly extending dome, a casing within which the receptacle is disposed, a fastening element for said casing, said fastening element extending upwardly above the bottom wall of the casing and into said dome, and having a bore therethrough, a stem depending from said dome through said bore, and means coacting with said stem to normally maintain the receptacle in a raised position.

7. A lubricant indicating mechanism for an internal combustion engine including a receptacle operable by gravity on accumulation of lubricant therein, an attaching bracket for disposition within the engine, means to pivot the receptacle to said bracket, a bracket exteriorly disposed on the engine, a lever pivoted to the second mentioned bracket, means cooperating with said lever to urge the receptacle to an elevated position, and indicating means operable through movement of said lever.

8. A lubricant indicating mechanism for an internal combustion engine including a receptacle depressible by gravity on accumulation of lubricant therein, bails pivotally mounting said receptacle within the engine, said receptacle having an outlet port, a valve for said outlet port having a stub depending therethrough for engagement with an obstruction, said receptacle having an inwardly extending dome, a stem depending from said dome, a lever disposed exteriorly of the engine, a bolt extending through the lever, said stem being in engagement with said lever, a spring on said bolt urging said lever upwardly, a crank arm on said lever, and indicating mechanism operable through movement of said crank arm.

In testimony whereof I affix my signature in presence of two witnesses.

JOHN W. SOFGE

Witnesses:
A. E. BURNSIDE,
WM P. BELOTE.